US010178663B2

(12) United States Patent
Liu et al.

(10) Patent No.: US 10,178,663 B2
(45) Date of Patent: Jan. 8, 2019

(54) METHOD FOR SHARING A WIRELESS TRANSMISSION MEDIUM IN A TERMINAL DEVICE AND WIRELESS COMMUNICATION DEVICE AND WIRELESS COMMUNICATION CIRCUIT RELATED THERETO

(71) Applicant: INTEL IP CORPORATION, Santa Clara, CA (US)

(72) Inventors: Chunhui Liu, Dresden (DE); Jose Cesares Cano, Dresden (DE); Assi Jakoby, Herzelia (IL)

(73) Assignee: Intel IP Corporation, Santa Clara, CA (US)

( * ) Notice: Subject to any disclaimer, the term of this patent is extended or adjusted under 35 U.S.C. 154(b) by 66 days.

(21) Appl. No.: 15/357,778

(22) Filed: Nov. 21, 2016

(65) Prior Publication Data

US 2017/0181148 A1 Jun. 22, 2017

(30) Foreign Application Priority Data

Dec. 22, 2015 (EP) .................................... 15201966

(51) Int. Cl.
*H04L 5/00* (2006.01)
*H04W 16/14* (2009.01)
(Continued)

(52) U.S. Cl.
CPC ......... *H04W 72/044* (2013.01); *H04L 5/0007* (2013.01); *H04W 4/80* (2018.02);
(Continued)

(58) Field of Classification Search
CPC ...... H04L 12/185; H04L 12/189; H04W 4/06; H04W 4/08; H04W 72/005;
(Continued)

(56) References Cited

U.S. PATENT DOCUMENTS 6,067,289 A * 5/2000 Mueller .............. H04W 88/181
370/310
6,088,325 A * 7/2000 Giardina ................ H04B 1/707
370/207
(Continued)

FOREIGN PATENT DOCUMENTS

WO 2014/027790 A1 2/2014

OTHER PUBLICATIONS

European Search Report and Search Opinion for EP 15 20 1966, dated Jun. 8, 2016, 8 pages.

*Primary Examiner* — Eric Nowlin
(74) *Attorney, Agent, or Firm* — Lowenstein Sandler LLP

(57) ABSTRACT

A method for sharing a wireless transmission medium in a terminal device between at least a first wireless communication technology and a second wireless communication technology and a wireless communication device and a wireless communication circuit related thereto, the first wireless communications technology being configured to set at least a first time frame for receiving a first signal via the first wireless communication technology at the terminal device, the first signal comprising a control region and a data region the control region indicating a schedule of the data region the method comprising: receiving at least the control region via the first wireless communication technology in the first time frame; interrupting reception of the first signal at least for the remainder of the first time frame after receiving the control region; and sending signals via the second wireless transmission technology within the first time frame after the reception of the first signal was interrupted.

19 Claims, 3 Drawing Sheets

(51) Int. Cl.
  *H04W 72/02* (2009.01)
  *H04W 72/04* (2009.01)
  *H04W 72/12* (2009.01)
  *H04W 84/12* (2009.01)
  *H04W 4/80* (2018.01)
  *H04W 84/04* (2009.01)
  *H04W 88/06* (2009.01)

(52) U.S. Cl.
  CPC ........... *H04W 16/14* (2013.01); *H04W 72/02* (2013.01); *H04W 72/042* (2013.01); *H04W 72/1215* (2013.01); *H04W 84/042* (2013.01); *H04W 84/12* (2013.01); *H04W 88/06* (2013.01)

(58) Field of Classification Search
  CPC . H04W 72/042; H04W 72/12; H04W 72/121; H04W 72/1278; H04W 76/27; H04W 76/40; H04W 28/18; H04W 36/0066; H04W 36/165; H04W 56/00; H04W 72/044; H04W 72/1215; H04W 84/042; H04W 84/12; H04W 88/02; H04W 88/06; H04W 88/08
  See application file for complete search history.

(56) References Cited

U.S. PATENT DOCUMENTS

| | | | | |
|---|---|---|---|---|
| 6,269,089 B1* | 7/2001 | Giardina | ................ | H04B 1/707 370/335 |
| 6,631,139 B2* | 10/2003 | El-Maleh | .............. | G10L 19/173 370/466 |
| 7,165,211 B2* | 1/2007 | Stein | .................... | H03M 13/41 714/795 |
| 8,064,948 B2* | 11/2011 | Meier | .................. | H04W 36/18 455/552.1 |
| 8,406,354 B2* | 3/2013 | Khayrallah | ........ | H04B 1/71072 375/346 |
| 8,681,762 B2* | 3/2014 | Matthes | ................ | H04W 16/14 370/328 |
| 8,750,088 B2* | 6/2014 | Jalali | .................. | H04B 7/18536 370/208 |
| 8,848,808 B2* | 9/2014 | Dress | ....................... | H03K 7/08 375/259 |
| 9,148,825 B2* | 9/2015 | Choi | ................. | H04W 36/0005 |
| 9,252,863 B2* | 2/2016 | Govindswamy | ..... | H04B 7/0817 |
| 9,294,234 B2* | 3/2016 | Wiberg | ................. | H04L 1/1829 |
| 9,544,418 B2* | 1/2017 | Shah | ....................... | H04W 76/10 |
| 9,848,408 B2* | 12/2017 | Sahu | ..................... | H04W 72/02 |
| 9,888,388 B2* | 2/2018 | Wei | ....................... | H04W 16/14 |
| 2002/0101844 A1* | 8/2002 | El-Maleh | .............. | G10L 19/173 370/342 |
| 2006/0064628 A1* | 3/2006 | Stein | ..................... | H03M 13/41 714/795 |
| 2007/0268873 A1* | 11/2007 | Borella | ............. | H04W 36/0066 370/338 |
| 2008/0115007 A1* | 5/2008 | Jalali | ................... | H04B 7/18536 714/1 |
| 2008/0134276 A1* | 6/2008 | Orrell | ................... | H04H 20/426 725/132 |
| 2009/0017756 A1 | 1/2009 | Tsfaty et al. | | |
| 2009/0232120 A1* | 9/2009 | Matthes | ................. | H04W 16/14 370/342 |
| 2011/0002365 A1* | 1/2011 | Khayrallah | ........ | H04B 1/71072 375/148 |
| 2012/0051470 A1* | 3/2012 | Schlegel | ........... | H04L 25/03171 375/341 |
| 2012/0069766 A1 | 3/2012 | Fu et al. | | |
| 2013/0051272 A1* | 2/2013 | Wiberg | ................. | H04L 1/1829 370/252 |
| 2013/0208587 A1* | 8/2013 | Bala | ....................... | H04W 16/14 370/230 |
| 2013/0208641 A1 | 8/2013 | Baghel et al. | | |
| 2013/0267234 A1* | 10/2013 | Choi | ................... | H04W 36/0005 455/437 |
| 2014/0029535 A1 | 1/2014 | Medapalli | | |
| 2014/0301493 A1* | 10/2014 | Govindswamy | ..... | H04B 7/0817 375/267 |
| 2014/0323175 A1* | 10/2014 | Shah | ..................... | H04W 76/10 455/550.1 |
| 2015/0029832 A1* | 1/2015 | Dress | ....................... | H03K 7/08 370/212 |
| 2018/0007502 A1* | 1/2018 | Coutinho | ................ | H04W 4/80 |
| 2018/0020462 A1* | 1/2018 | Xiong | ............... | H04W 72/1215 |
| 2018/0077728 A1* | 3/2018 | Shi | ......................... | H04W 76/10 |
| 2018/0241720 A1* | 8/2018 | Healy | ................. | H04L 63/0245 |

* cited by examiner

METHOD FOR SHARING A WIRELESS TRANSMISSION MEDIUM IN A TERMINAL DEVICE AND WIRELESS COMMUNICATION DEVICE AND WIRELESS COMMUNICATION CIRCUIT RELATED THERETO

RELATED APPLICATION

This application claims priority to European Patent Application No. 15201966.7, filed Dec. 22, 2015, the contents of which are hereby incorporated by reference herein.

TECHNICAL FIELD

Embodiments described herein generally relate to methods for sharing a wireless transmission medium in a terminal device and to wireless communication devices and wireless communication circuits related thereto.

BACKGROUND

Modern terminal devices (e.g. mobile devices, smartphones, laptops, etc.) integrate a multitude of mobile communication interfaces (UMTS/LTE/GSM, WLAN/WIFI, Bluetooth, . . . ), that at least partially use the same transmission medium for wireless communication. Reception of signals via a first wireless communication interface may be disturbed by sending a signal via a second wireless communication interface due to interference, cross-talking or similar processes, if they share the wireless transmission medium (if they communicate via same or similar/close/near/neighboring/adjacent or subharmonic frequency bands or frequencies), especially since the antenna for sending the signals of the second wireless communication interface is arranged usually very close to the antenna receiving the signal of the first wireless communication interface, what facilitates interference and cross-talk between the wireless communication interfaces.

DESCRIPTION

Figure 1:
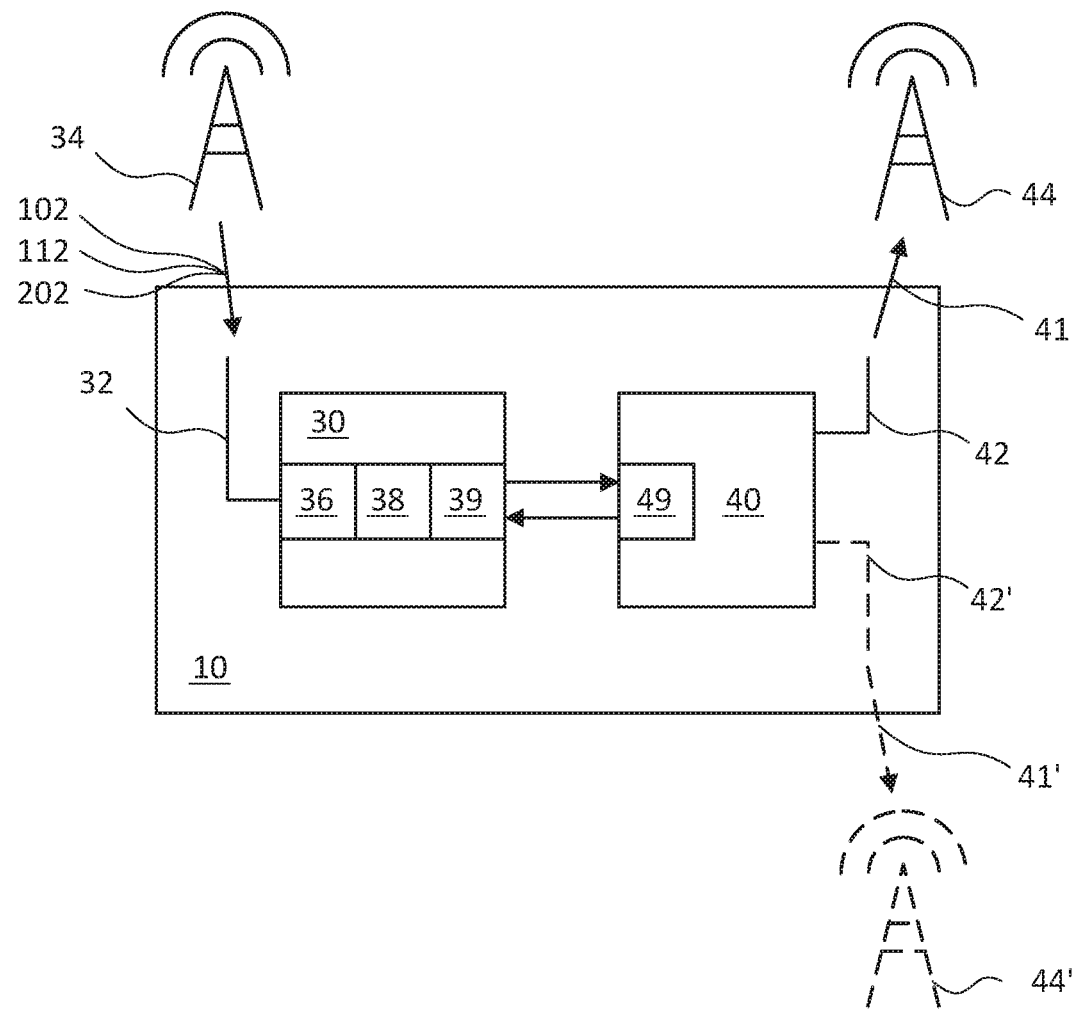
FIG. 1 shows a terminal device for communicating according to a first and a second wireless communication technology

FIG. 1 shows a terminal device 10 (user equipment). The terminal device may be a handheld or a stationary equipment, e.g. a smartphone, a home computer, a laptop, a (internet) router or similar. The terminal device 10 includes a wireless communication device 20. The wireless communication device 20, includes a first wireless communication circuit 30 and a second wireless communication circuit 40.

The first wireless communication circuit 30 is configured to communicate according to a first wireless communication technology. The first wireless communication circuit 30 may include an antenna 32 to communicate. The first wireless communication circuit 30 may be configured to communicate with a first base station 34, configured according to the first wireless communication technology. The second wireless communication circuit 40 is configured to communicate according to a second wireless communication technology. The second wireless communication circuit 40 may include an antenna 42, e.g. for WLAN communication. The second wireless communication circuit 40 may include a further antenna 42', e.g. for BT communication. The second communication circuit 40 may comprise separate controllers for different communication technologies (e.g. WLAN and BT), e.g. coupled to different antennas 42, 42'. The second wireless communication circuit 40 may be configured to communicate with a second base station 44, e.g. send signals 41, 41', configured according to the second wireless communication technology.

The first wireless communication technology may a cellular wide area communication technology. The first wireless communication technology may be a control regime technology wherein communication between participants of the first wireless communication technology is performed according to predetermined time schedules and/or within predetermined time intervals. The first wireless communication technology may be a Long Term Evolution (LTE) technology. The first wireless communication technology may be a third Generation Partnership Program (3GPP) Technology. The second wireless communication technology may be a short range communication technology. The second wireless communication technology may be a data regime technology, wherein participants of the second wireless communication technology, e.g. the second communication circuit, may be allowed to send signals into the wireless communication medium at any time, unless a different participant is already using it. The second wireless communication technology may be a wireless local area network technology (WIFI/WLAN) or a Bluetooth technology. The time frames may be subframes according to LTE-definition. The first wireless communication technology may be a control regime communication technology, while time frames may be frames or subframes according to that technology (i.e. smallest time intervals under the control regime).

The first and second wireless communication technology share the same wireless transmission medium. The first wireless communication circuit 30 is configured to at least receive signals via a first wireless transmission medium using a first frequency or frequency range/frequency band. The second wireless transmission medium may consist of the first frequency or frequency range and the neighboring frequencies/frequency ranges of the first frequency or frequency range. The second wireless communication circuit 40 may be configured to at least send signals 41, 41' via a second wireless transmission medium using a first frequency or frequency range/frequency band. The second wireless transmission medium may consist of the second frequency or frequency range and the neighboring frequencies/frequency ranges of the second frequency or frequency range. The first and second wireless transmission medium may include at least an overlap in frequency ranges, e.g. may have the same frequency range.

Figure 2:
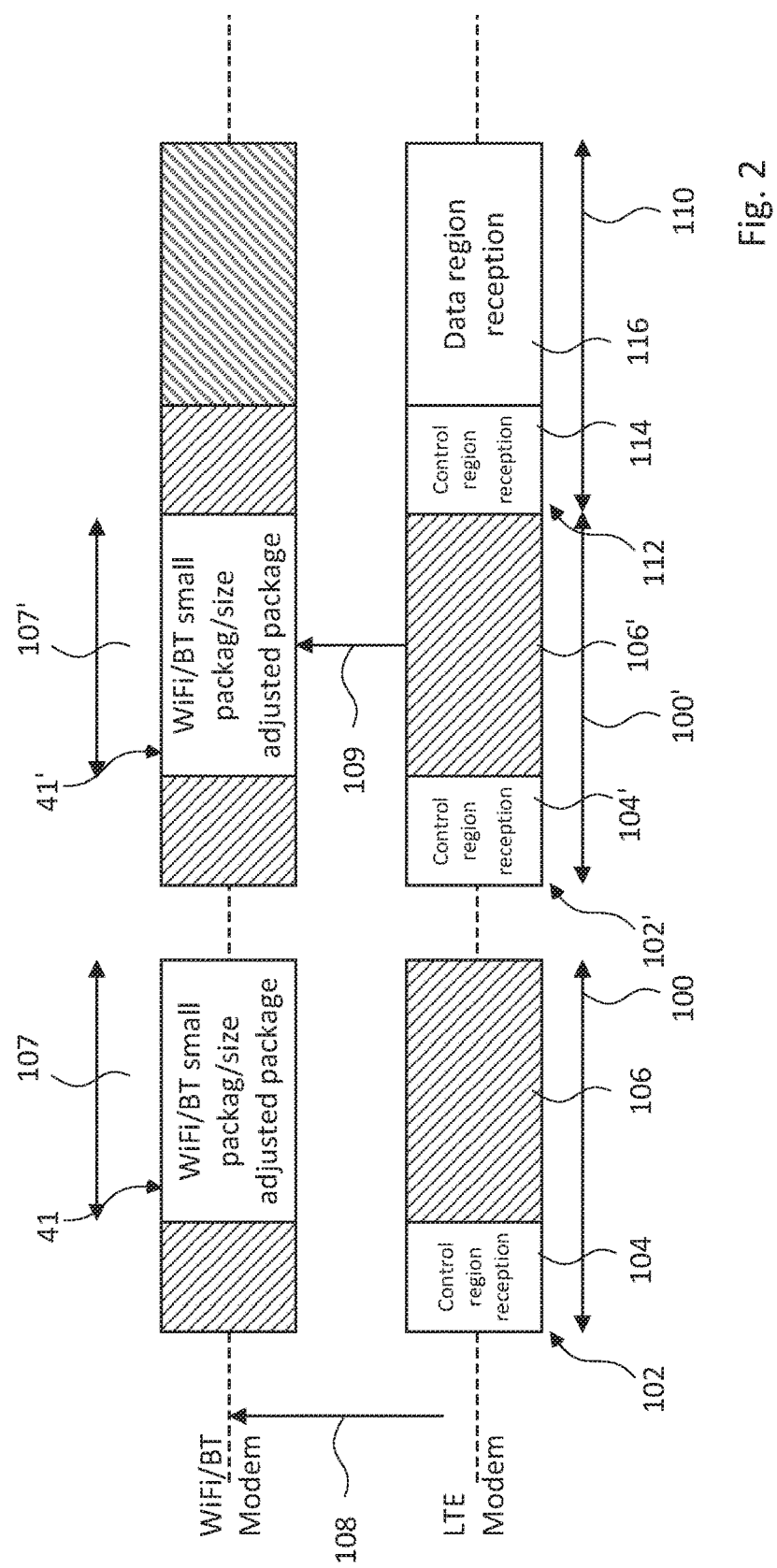
FIG. 2 shows a time diagram of a communication via a first and a second wireless communication technology using a first method for sharing a wireless transmission medium
Figure 3:
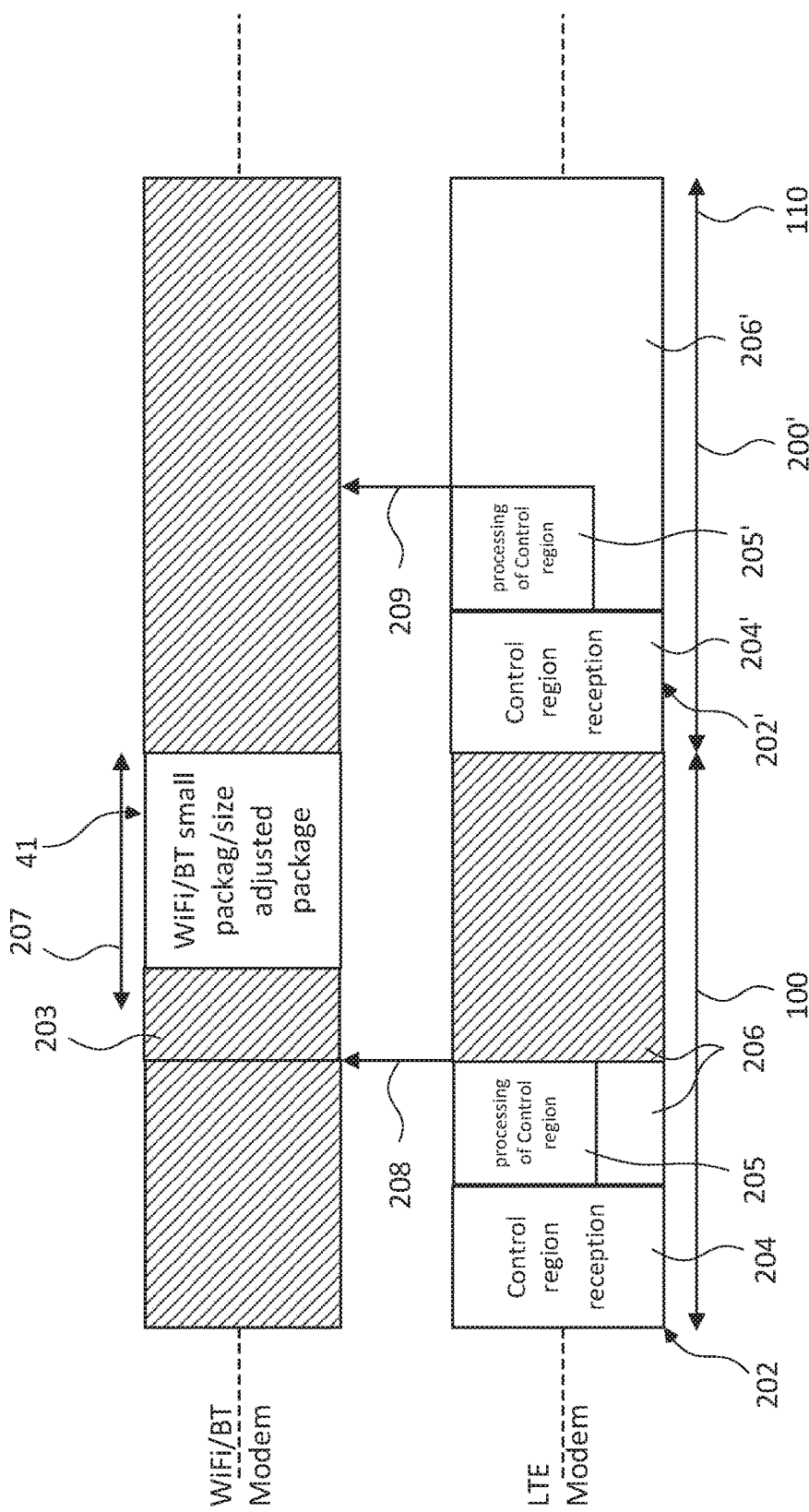
FIG. 3 shows a time diagram of a communication via a first and a second wireless communication technology using a second method for sharing a wireless transmission medium

The first wireless communication technology is configured to set at least a first time frame 100, 200 for receiving at least a first signal 102, 202 via the first wireless communication technology at the first wireless communication circuit 30, the first signal 102, 202 including a control region 104, 204 (also "control signal") and a data region 106, 206 (also "data signal"), the control region 104, 204 indicating a schedule of the data region 106, 206 (see FIGS. 2 and 3). The first signal 102, 202 may be comprised of a single (cohesive/connected) control region 104, 204 during the first time frame 100, 200. The control region 104, 204 may be a leading part/portion of the first signal 102, 202. The control region 104, 204 may include a Physical Downlink Control Channel (PDCCH), a Physical Control Format Indicator Channel (PCFICH), a Physical Hybrid ARQ Indicator Channel (PHICH) and/or Cell-Specific Reference Signals (CRS). The data region may include a Physical Downlink Shared Channel (PDSCH), a Physical Multicast Channel (PMCH), a Physical Broadcast Channel (PBCH) and/or any type of Reference Signal.

The data region 106, 206 may follow the control region 104, 204. The signal 100, 200 may be an orthogonal frequency-division multiplexing (OFDM) signal or a different broadband signal. The data region 104, 204 may overlap with the control region 104, 204. The control region 104, 204 may be a Physical Downlink Control Channel (PDCCH) signal. The data region 106, 206 may be a Physical Downlink Shared Channel (PDSCH) signal.

The schedule (e.g. the PDCCH) may include information whether the first wireless communication circuit 30 (the terminal device 10) is scheduled to receive data during the data region 106, 206 or not. The schedule may include information about a position/timing of the data, the first wireless communication circuit 30 (the terminal device 10) is scheduled to receive, within the data region 106, 206.

The first wireless communication circuit 30 may include a reception circuit 36. The reception circuit 36 may include at least one amplifier. The reception circuit 36 may be configured to receive at least the control region 104, 204 via the first wireless communication technology in the first time frame 100, 200. The reception circuit 36 may be connected to the antenna 32. The reception circuit 36 may be configured to receive signals sent by the base station 34 of the wireless communication technology via the antenna 32. The first wireless communication circuit may include a control circuit 38. The control circuit 38 may be coupled to the reception circuit 36. The control circuit 38 may be configured to decode the signals received via the reception circuit 36. The control circuit 38 may be configured to decode signals received via the first wireless communication technology to receive at least information about a start, e.g. information of the start and an end, of at least the first time frame 100, 200. The control circuit 38 may be configured to start a reception of the first signal 102, 202 at the start of the first time frame 100, 200. The control circuit 38 may be configured to start the reception of the first signal 102, 202 by activating (e.g. powering) the reception circuit 36, e.g. by activating at least a reception circuitry (amplifier and other components) of the reception circuit 36.

The control circuit 38 may be configured to interrupt the reception of the first signal 102, 202 after receiving the control region 104, 204. The control circuit 38 may be configured to decode the control region 104, 204. The control circuit 38 may be configured to decode the control region 104, 204 during the first time interval 100, 200. The control circuit 38 may be configured to deactivate/shut off (unpower) the reception circuit 36 to interrupt the reception of the first signal 102, 202. The control circuit 38 may be configured to interrupt the reception of the first signal 102, 202, by deactivating/shutting off at least an amplifier of the reception circuit 36. The control circuit 38 may be configured to enter an idle mode after decoding the control region 104, 204 to interrupt the reception of the first signal 102, 202.

The first wireless communication circuit 30 is configured to receive at least the control region 104, 204 via the first wireless communication technology in the first time frame 100, 200. The first wireless communication circuit 30 is configured to interrupt reception of the first signal 102, 202 at least for the remainder of the first time frame 100, 200 after receiving the control region 104, 204. The control circuit 38 is configured to send a command to the second wireless communication circuit 40, allowing the second wireless communication circuit 40 to send signals via the second wireless transmission technology at least within the first time frame 100, 200 after the reception circuit was deactivated. The second wireless communication circuit 40 is configured to send signals via the second wireless transmission technology within the first time frame 100, 200 after the reception of the first signal 102, 202 of the first wireless communication technology was interrupted (only if there is any data to be transmitted by the second wireless communication circuit 40). The first wireless communication circuit 30 and the second wireless communication circuit may each include a communication interface 39, 49. The communication interfaces 39, 49 may be configured to allow a communicating at least from the first wireless communication circuit 30 to the second wireless communication circuit 40. The communication interfaces 39, 49 may further be configured to allow a communicating at least from the second wireless communication circuit 40 to the first wireless communication circuit 30. The communication interface may be a Universal Asynchronous Receiver Transmitter (UART).

The proposed terminal devices, methods, wireless communication devices and wireless communication circuits may improve coexistence between wireless communication technologies. A high availability of the first wireless communication circuit and a low to none data loss via the first wireless communication technology may be achieved. A high and/or constant data throughput and/or low response times may be achieved with the second wireless communication circuit. A low energy consumption may be achieved, e.g. since the reception circuit may be unpowered.

FIG. 2 shows a time schedule and actions undertaken according to a first operation mode (PDCCH only mode/Control region-only reception mode)—actions described in the following, e.g. of the control circuit 38, shall refer to this second operation mode but shall not be limited thereto. FIG. 2 shows a usage of the first wireless communication technology (bottom) and the second wireless communication technology (top) over time. Hereby shaded portions mark times in which the second wireless communication circuit 40 is not sending or the first wireless communication circuit 30 is not receiving respectively. The control circuit 38 may be configured to analyze a usage condition of the first wireless communication technology. The control circuit 38 may be configured to enter the first operation mode when it is detected that no traffic/data was received via the first wireless communication technology for at least one, e.g. at least two, e.g. at least five, e.g. at least ten, e.g. at least 20, e.g. at least 50, e.g. at least 100, past time frame(s). The control circuit 38 may be configured to enter the first operation mode when it is detected that only some, e.g. one, e.g. two, e.g. five, e.g. ten, e.g. 20, time frames of the most recent, e.g. five, e.g. ten, e.g. 20, e.g. 50, e.g. 100, time frames, e.g. less than 50%, e.g. less than 20%, e.g. less than 10%, e.g. less than 5%, contained data to be received by (addressed to) the terminal device (the first wireless communication circuit). The first wireless communication circuit 30 may be configured to communicate via the wireless transmission medium and a further wireless transmission medium (bandwidth), wherein the further wireless transmission medium does not interfere with the transmission medium (of the second wireless transmission technology). The control circuit 38 may be configured to enter the first operation mode when it is detected that no traffic/data is being received via the wireless transmission medium, while traffic/data is being received via the further wireless transmission medium. The control circuit 38 may be configured to interrupt the reception via the wireless transmission medium, while a reception of signals via the further transmission medium is uphold.

The control circuit 38 may be configured to enter the first operation mode before the first time frame 100. The control circuit 38 may be configured to send a command 108 to the second wireless communication circuit 40 before the first time frame 100, 100' (when entering the first operation mode), allowing the second wireless communication circuit 40 to send signals via the second wireless transmission technology, during a period 107, 107' of the successive time frames (e.g. the first time frame 100, 100'), the period 107, 107' being the times during which the reception of the first signal 102 is interrupted. The command 108 sent to the second wireless communication circuit may include information about the timing of the period 107, 107'. The command 108 sent to the second wireless communication circuit may include information about a length of available time and the second wireless communication circuit may be configured to decide whether to use the opportunity depending on the length of available time. Under the condition that the time frame 100, 100' is an LTE-subframe, the period 107, 107' for which the reception is interrupted has a length of about 650 μs (microseconds). Under the condition that the second wireless communication technology is a WLAN technology about 458 μs (e.g. according to 802.11a definition which has a header length of about 192 μs) or about 554 μs (e.g. according to 802.11a definition which has a header length of about 96 μs) may be available for data transmission via the second wireless communication technology. Under the condition that the second wireless communication technology is a Bluetooth Technology, any part of the period 107, 107' may be used by a Bluetooth time slot, which has a length of about 400 μs—in case the timings of the two wireless communication technologies do not add up correctly, it is also possible to use only a part of the Bluetooth time slot for transmission. Further, the second wireless communication circuit 40 may be configured to communicate according to a WLAN technology and a Bluetooth technology and to use the period 107, 107' for the technology that needs is at that moment.

The control circuit 38 may be configured to interrupt the reception of the first signal 102 before the control region 104 is completely decoded. The control circuit 38 may be configured to interrupt the reception of the first signal 102 before the decoding of the control region 104 can determine if data is scheduled to be received within the first time frame 100. The control circuit 38 may be configured to interrupt the reception of the first signal 102 immediately after the complete control region 104 was received. The control circuit 38 may be configured to interrupt the reception of the first signal 102 until the start of the next time frame 100', 110. The control circuit 38 may be configured to interrupt the reception of the first signal 102 for the period 107, 107', from immediately after the complete control region 104 was received to the start of the next time frame 100', 110.

The first wireless communication technology (a base station of the wireless communication technology) may be configured to retransmit unreceived data (data sent without acknowledged receipt) in a subsequent time frame 110, e.g. according to Hybrid automatic repeat request (HARQ)—procedure. The first fireless communication circuit 30 may be configured to receive retransmissions of unreceived data. The subsequent time frame 110 may be the time frame immediately following the first time frame 100, 100'. The subsequent time frame 110 may be later than the immediately following time frame. The control circuit 38 may be configured to send a signal to the base station 32 acknowledging receipt, if data was received correctly. The control circuit 38 may be configured to prevent a deactivation of the reception circuit 36 at least during the subsequent time frame 110 for receiving a signal 112 via the first wireless communication technology, when the decoding of the control region 104, 104' results in the information (when it is determined) that data was scheduled to be received within the first time frame 100, 100'. The control circuit may be configured to keep the receiving circuit 36 activated independent of a content of control region 114 of a signal 112 during the subsequent time frame 110. The control circuit 38 may be configured to prevent a deactivation of the reception circuit 36 (keep the reception circuit 36 activated) at least for the immediately following time frame 110 for receiving a signal 112 via the first wireless communication technology, when the decoding of the control region 104, 104' results in the information that data was scheduled to be received within the first time frame 100, 100'. The control circuit 38 may be configured to prevent a deactivation of the reception circuit 36 at least for the following time frames 110 until the data that was originally scheduled to be received in the first time frame 100, 100' is received in the subsequent time frame 110, e.g. in a data region 116 of the signal 112 during the subsequent time frame 110. The control circuit 38 may be configured to deactivate the first operation mode, when the decoding of the control region 104, 104' results in the information that data was scheduled to be received within the first time frame 100, 100'. The control circuit 38 may be configured to send a command to the second wireless communication circuit 40, disallowing the usage of the periods on a time frame by time frame basis.

When the decoding of the control region 104, 104' results in the information that data was scheduled to be received within the first time frame 100, 100', the control circuit 38 may be configured to send a command 109 to the second wireless communication circuit 40 disallowing the second wireless communication circuit 40 to send signals via the second wireless transmission technology at least during the subsequent time frame 110, e.g. at least during the immediately following time frame 110, e.g. during all future time frames 110 until the retransmitted data that was scheduled to be received during the first time frame 100, 100' is received, e.g. until another command that allows the second wireless communication circuit 40 to send signals via the second wireless transmission technology is received.

Alternatively, in the first operation mode, the control circuit 38 may be configured to send commands to the second wireless communication circuit 40, allowing a usage of the periods after the control region is received for sending signals according to the second wireless communication technology, on a time frame by time frame basis for each time frame in which the reception will be (is planned to get) interrupted.

Using the first operation mode, a low energy consumption can be achieved, e.g. since the reception circuit may be deactivated for the longest time possible without losing any portion of the control region.

FIG. 3 shows a time schedule and actions undertaken according to a second operation mode (early PDCCH mode/ early PDCCH decoding mode/early control region decoding mode)—actions, e.g. of the control circuit 38, described in the following shall refer to this second operation mode but shall not be limited thereto. FIG. 3 shows a usage of the first wireless communication technology (bottom) and the second wireless communication technology (top) over time. Hereby shaded portions mark times in which the second wireless communication circuit 40 is not sending or the first wireless communication circuit 30 is not receiving respectively. The control circuit 38 may be configured to analyze a usage condition of the first wireless communication technology. The control circuit 38 may be configured to enter the second operation mode when it is detected that no traffic/data was received via the first wireless communication technology for at least one, e.g. at least two, e.g. at least five, e.g. at least ten, e.g. at least 20, e.g. at least 50, e.g. at least 100, time frame(s). The control circuit 38 may be configured to enter the second operation mode when it is detected that only some, e.g. one, e.g. two, e.g. five, e.g. ten, e.g. 20, time frames of the most recent, e.g. five, e.g. ten, e.g. 20, e.g. 50, e.g. 100, time frames, e.g. less than 50%, e.g. less than 20%, e.g. less than 10%, e.g. less than 5%, contained data to be received by (addressed to) the terminal device (the first wireless communication circuit). The first wireless communication circuit 30 may be configured to communicate via the wireless transmission medium and a further wireless transmission medium (bandwidth), wherein the further wireless transmission medium does not interfere with the transmission medium (of the second wireless transmission technology). The control circuit 38 may be configured to enter the second operation mode when it is detected that no traffic/data is being received via the wireless transmission medium, while traffic/data is being received via the further wireless transmission medium. The control circuit 38 may be configured to interrupt the reception via the wireless transmission medium, while a reception of signals via the further transmission medium is uphold.

The control circuit 38 may be configured to decide which of the first or second operation mode to enter based on traffic conditions. The control circuit may be configured to decide which of the first or second operation mode to enter based on at least one system parameter, e.g. battery condition, usage profile of the second wireless communication technology etc. Entering the first operation mode may be preferred in a no-traffic condition or if a low battery status is detected, while entering the second operation mode may be preferred in a low or bursty traffic condition.

The control circuit 38 may be configured to enter the second operation mode before the first time frame 200. The control circuit 38 may be configured to send a command to the second wireless communication circuit 40 before the first time frame 200 (when activation the second operation mode), allowing the second wireless communication circuit 40 to send signals via the second wireless transmission technology, during a period 207 of the successive time frames (e.g. the first time frame 200), the period(s) 207 being the times during which the reception of the first signal 202 is interrupted and that follow a processing period 203. The command sent to the second wireless communication circuit may include information about the timing of the period(s) 207.

The control circuit 38 may be configured to deactivate the reception circuit 36 (only) after the control region 204 has been decoded. The reception of the control region 204 may include the decoding of the control region 204.

The control circuit 38 may be configured to decode the control region 204 immediately after receiving the control region 204. The control circuit 38 may be configured to start decoding the control region 204 during receipt of the control region 204. The control circuit 38 may be configured to decode the control region 204 immediately after receiving the control region 204 has been completed. The control circuit 38 may be configured to finish decoding the control region 204 within a decoding period 205, 205'. The control circuit 38 may be configured to keep the reception circuit active at least during the decoding period 205, 205', in case data to be received by the first wireless communication circuit is located in this portion of the data region 206.

The control circuit 38 may be configured to interrupt the reception of the first signal 202 (only), when the decoding of the control region 204 results in the information that no data is scheduled to be received within the first time frame 200. The control circuit 38 may be configured to interrupt the reception of the first signal for a period 207. The period 207 may start at the end of the decoding period 205 and end at the start of the subsequent time frame. When the decoding of the control region 204 results in the information that no data is scheduled to be received within the first time frame 200, the control circuit 38 may be configured to send a command 208 to the second wireless communication circuit 40 after the control region 204 has been decoded, e.g. after the decoding period 205, e.g. at the end of the decoding period 205. The command 208 may allow the second wireless communication circuit 40 to send signals via the second wireless transmission technology during the period 207.

The second wireless communication circuit 40 may be configured to process the command 208 within a processing period 203. The second wireless communication circuit 40 may be configured to send signals via the second wireless communication technology when the command 208 allows that.

Under the condition that the time frame 200 is an LTE-subframe, the period 207 for which the reception is interrupted (after the processing period) has a length of about 400 µs (microseconds). Under the condition that the second wireless communication technology is a WLAN technology about 208 µs (e.g. according to 802.11a definition which has a header length of about 192 µs) or about 304 µs (e.g. according to 802.11b or newer definition which has a header length of about 96 µs) may be available for data transmission via the second wireless communication technology. Under the condition that the second wireless communication technology is a Bluetooth Technology, the second wireless communication circuit may be configured to limit a data region of a Bluetooth time slot (which usually has a length of 400 µs) to a length that fits into the period 207. Further, the second wireless communication circuit 40 may be configured to communicate according to a WLAN technology and a Bluetooth technology and to use the period 207 for the technology that needs is at that moment.

The control circuit 38 may be configured to continue the reception of the first signal 200' when the decoding of the control region 204' results in the information that data is scheduled to be received within the first time frame 200'. When the decoding of the control region 204' results in the information that data is scheduled to be received within the first time frame 200', the control circuit 38 may be configured to send a command 209 to the second wireless communication circuit 40 after the control region 204' has been decoded, e.g. after the decoding period 205', e.g. at the end of the decoding period 205'. The command may disallow the second wireless communication circuit 40 to send signals via the second wireless transmission technology.

The second wireless communication circuit 40 may be configured to process the command 209 within a processing period 203'. The second wireless communication circuit 40 may be configured to remain silent within the period 207'.

Alternatively the second wireless communication circuit 40 may be configured to and/or the control circuit 38 has sent a command to the second wireless communication circuit 40 to be inactive unless a command allows activity on a time frame by time frame basis. Alternatively the second wireless communication circuit Using the second operation mode, a high availability of the first wireless communication circuit/technology and/or low to none data loss may be achieved, e.g. since the reception of the first wireless communication circuit is (only) interrupted, if it is sure that no data are to be received.

At least in the first and second operation mode, the second wireless communication circuit 40 may be configured to (only) send signals via the second wireless communication technology when it is allowed to by the first wireless communication circuit 30.

According to further embodiments, the first wireless communication technology and the second wireless communication technology may be wireless telecommunication technologies. The first wireless communication circuit may include or be coupled to a first subscriber identity module (SIM) (primary sim), while the second communication circuit may include or be coupled to a second subscriber identity module (SIM) (secondary SIM/auxillary SIM). The first wireless communication circuit may be configured to communicate via an LTE technology, while the second wireless communication circuit may be configured to communicate via a GSM technology.

The first wireless communication technology may use a frequency division duplexing mode, wherein at least the frequency band used for sending signals to the terminal device is part of the shared wireless transmission medium.

The following examples pertain to further embodiments.

Example 1 is a Method for sharing a wireless transmission medium in a terminal device between at least a first wireless communication technology and a second wireless communication technology, the method comprising: receiving in a first time frame at least a control region of a first signal via the first wireless communication technology, the first time frame being set by the first communication technology for receiving the first signal and the control region indicating a schedule of a data region in the first signal; interrupting reception of the first signal at least for the remainder of the first time frame after receiving the control region; sending a command from a first wireless communication circuit of the terminal device to a second wireless communication circuit of the terminal device, to allow the second communication circuit to send signals via the second wireless transmission technology within the first time frame after the reception of the first signal was interrupted, the first wireless communication circuit being configured to communicate via the first wireless communication technology and the second wireless communication circuit being configured to communicate via the second wireless communication technology; and sending signals via the second wireless transmission technology within the first time frame after the reception of the first signal was interrupted.

In Example 2, the subject matter of Example 1 can optionally include that receiving the control region includes decoding of the control region by the terminal device.

In Example 3, the subject matter of Example 2 can optionally include that the control region is decoded immediately after receiving the control region.

In Example 4, the subject matter of any of the Examples 2-3 can optionally include that the reception of the first signal is (only) interrupted when the decoding of the control region results in the information that no data is scheduled to be received by the terminal device within the first time frame.

In Example 5, the subject matter of any of the Examples 1-4 can optionally include: decoding the control region of the first time frame, wherein the reception of the first signal is interrupted before the control region is completely decoded by the terminal device.

In Example 6, the subject matter of Example 5 can optionally include that the reception of the first signal of the first wireless communication is interrupted before the decoding of the control region can determine if data is scheduled to be received by the terminal device within the first time frame.

In Example 7, the subject matter of any of the Example 6 can optionally include that the first wireless communication technology is configured to retransmit data not received by the terminal device in a subsequent time frame, the method further including: preventing an interruption of reception of a subsequent signal of at least the subsequent time frame of the first wireless communication technology, when the decoding of the control region results in the information that data was scheduled to be received by the terminal device within the first time frame.

In Example 8, the subject matter of any of the Examples 1-7 can optionally include that the first wireless communication technology is a cellular wide area communication technology.

In Example 9, the subject matter of Example 8 can optionally include that the first wireless communication technology is a Long Term Evolution technology and the first time frame is an LTE subframe.

In Example 10, the subject matter of any of the Examples 1-9 can optionally include that the second wireless communication technology is a short range communication technology.

In Example 11, the subject matter of Example 10 can optionally include that the second wireless communication technology is a wireless local area network technology or a Bluetooth technology.

In Example 12, the subject matter of any of the Examples 1-11 can optionally include that the control region is a leading part of the first signal.

In Example 13, the subject matter of Example 12 can optionally include that the data region follows the control region.

Example 14 is a wireless communication device, comprising: a first wireless communication circuit, configured to communicate according to a first wireless communication technology; and a second wireless communication circuit, configured to communicate according to a second wireless communication technology; the first wireless communication circuit being configured to receive in a first time frame at least a control region of a first signal via the first wireless communication technology, the first time frame being set by the first communication technology for receiving the first signal and the control region indicating a schedule of a data region in the first signal, and to interrupt reception of the first signal at least for the remainder of the first time frame after receiving the control region, and the second wireless communication circuit being configured to send signals via the second wireless transmission technology within the first time frame after the reception of the first signal of the first wireless communication technology was interrupted.

In Example 15, the subject matter of Examples 14 can optionally include that the first wireless communication circuit is configured to decode the control region.

In Example 16, the subject matter of Example 15 can optionally include that the first wireless communication circuit is configured to interrupt reception of the first signal of the first wireless communication technology (only) after the control region has been decoded.

In Example 17, the subject matter of any of the Examples 15-16 can optionally include that the first wireless communication circuit is configured to decode the control region immediately after receiving the control region.

In Example 18, the subject matter of any of the Examples 15-17 can optionally include that the first wireless communication circuit is configured to interrupt reception of the first signal of the first wireless communication (only) when the decoding of the control region results in the information that no data is scheduled to be received by the terminal device within the first time frame.

In Example 19, the subject matter of any of the Examples 15-18 can optionally include that the first wireless communication circuit is configured to interrupt the reception of the first of the first wireless communication before the control region is completely decoded.

In Example 20, the subject matter of any of the Examples 15-19 can optionally include that the first wireless communication circuit is configured to interrupt the reception of the first of the first wireless communication before the decoding of the control region can determine if data is scheduled to be received by the terminal device within the first time frame.

In Example 21, the subject matter of any of the Examples 19-20 can optionally include that the first wireless communication technology is configured to retransmit unreceived data in a subsequent time frame, and wherein the first wireless communication circuit is configured to prevent an interruption of reception of a further signal of at least the subsequent time frame of the first wireless communication technology, when the decoding of the control region results in the information that data was scheduled to be received within the first time frame.

In Example 22, the subject matter of any of the Examples 14-21 can optionally include that the first wireless communication technology is a cellular wide area communication technology.

In Example 23, the subject matter of Example 22 can optionally include that the first wireless communication technology is a Long Term Evolution technology and the first time frame is an LTE subframe.

In Example 24, the subject matter of any of the Examples 14-23 can optionally include that the second wireless communication technology is a short range communication technology.

In Example 25, the subject matter of Example 24 can optionally include that the second wireless communication technology is a wireless local area network technology or a Bluetooth technology.

In Example 26, the subject matter of any of the Examples 14-25 can optionally include that the first and second wireless communication technology share the same wireless transmission medium.

In Example 27, the subject matter of any of the Examples 14-26 can optionally include that the control region is a leading part of the first signal.

In Example 28, the subject matter of Example 27 can optionally include that the data region follows the control region.

Example 29 is a wireless communication circuit for communicating according to a first wireless communication technology, comprising: a reception circuit configured to receive in a first time frame at least a control region of a first signal via the first wireless communication technology, the first time frame being set by the first communication technology for receiving the first signal and the control region indicating a schedule of a data region in the first signal; a control circuit configured to interrupt the reception of the first signal after receiving the control region; and the control circuit being configured to send a command to at least a second wireless communication circuit, allowing the second wireless communication circuit to send signals via a second wireless transmission technology at least within the first time frame after reception of the first signal was interrupted.

In Example 30, the subject matter of Example 29 can optionally include that the control circuit is configured to deactivate the reception circuit to interrupt the reception of the first signal.

In Example 31, the subject matter of any of the Examples 29-30 can optionally include that the control circuit is configured to decode the control region.

In Example 32, the subject matter of Example 31 can optionally include that the control circuit is configured to deactivate the reception circuit (only) after the control region has been decoded.

In Example 33, the subject matter of any of the Examples 31-32 can optionally include that the control circuit is configured to decode the control region immediately after receiving the control region.

In Example 34, the subject matter of any of the Examples 31-33 can optionally include that the control circuit is configured to interrupt the reception of the first signal (only), when the decoding of the control region results in the information that no data is scheduled to be received within the first time frame.

In Example 35, the subject matter of any of the Examples 31-34 can optionally include that the control circuit is configured to send a command to the second wireless communication circuit after the control region has been decoded, the command allowing the second wireless communication circuit to send signals via the second wireless transmission technology, when the decoding of the control region results in the information that no data is scheduled to be received within the first time frame, and the command disallowing the second wireless communication circuit to send signals via the second wireless transmission technology, when the decoding of the control region results in the information that data is scheduled to be received within the first time frame.

In Example 36, the subject matter of any of the Examples 31-35 can optionally include that the control circuit is configured to interrupt the reception of the first signal before the control region is completely decoded.

In Example 37, the subject matter of any of the Examples 31-36 can optionally include that the control circuit is configured to interrupt the reception of the first signal before the decoding of the control region can determine if data is scheduled to be received within the first time frame.

In Example 38, the subject matter of any of the Examples 36-37 can optionally include that the first wireless communication technology is configured to retransmit unreceived data in a subsequent time frame, and wherein the control circuit is configured to prevent a deactivation of the reception circuit at least during the subsequent time frame for receiving signals via the first wireless communication technology, when the decoding of the control region results in the information that data was scheduled to be received within the first time frame.

In Example 39, the subject matter of Example 38 can optionally include that the control circuit is configured to send a command to the second wireless communication circuit disallowing the second wireless communication circuit to send signals via the second wireless transmission technology during the subsequent time frame, when the decoding of the control region results in the information that data was scheduled to be received within the first time frame.

In Example 40, the subject matter of any of the Examples 29-39 can optionally include that the first wireless communication technology is a cellular wide area communication technology.

In Example 41, the subject matter of Example 40 can optionally include that first wireless communication technology is a Long Term Evolution technology and the first time frame is an LTE subframe.

In Example 42, the subject matter of any of the Examples 29-41 can optionally include that the second wireless communication technology is a short range communication technology.

In Example 43, the subject matter of Example 42 can optionally include that second wireless communication technology is a wireless local area network technology or a Bluetooth technology.

In Example 44, the subject matter of any of the Examples 29-43 can optionally include that the first and second wireless communication technology share the same wireless transmission medium.

In Example 45, the subject matter of any of the Examples 29-44 can optionally include that the control region is a leading part of the first signal.

In Example 46, the subject matter of Example 45 can optionally include that the data region follows the control region.

What is claimed is:

1. A method for sharing a wireless transmission medium in a terminal device between at least a first wireless communication technology and a second wireless communication technology, the method comprising:
   receiving in a first time frame at least a control region of a first signal via the first wireless communication technology, the first time frame being set by the first communication technology for receiving the first signal and the control region indicating a schedule of a data region in the first signal;
   decoding the control region of first time frame;
   interrupting reception of the first signal at least for a remainder of the first time frame after receiving the control region and before the control region is completely decoded by the terminal device;
   sending a command from a first wireless communication circuit of the terminal device to a second wireless communication circuit of the terminal device, to allow the second communication circuit to send signals via the second wireless transmission technology within the first time frame after the reception of the first signal was interrupted, the first wireless communication circuit being configured to communicate via the first wireless communication technology and the second wireless communication circuit being configured to communicate via the second wireless communication technology; and
   sending the signals via the second wireless transmission technology within the first time frame after the reception of the first signal was interrupted.

2. The method of claim 1, wherein receiving the control region includes the decoding of the control region by the terminal device.

3. The method of claim 2, wherein the control region is decoded after receiving the control region.

4. The method of claim 1, wherein the reception of the first signal of the first wireless communication is interrupted before the decoding of the control region can determine if data is scheduled to be received by the terminal device within the first time frame.

5. The method of claim 4, wherein the first wireless communication technology is configured to retransmit data not received by the terminal device in a subsequent time frame, the method further including:
   preventing an interruption of reception of a subsequent signal of at least the subsequent time frame of the first wireless communication technology, when the decoding of the control region results in the information that data was scheduled to be received by the terminal device within the first time frame.

6. The method of claim 1, wherein the first wireless communication technology is a cellular wide area communication technology.

7. The method of claim 6, wherein the first wireless communication technology is a Long Term Evolution technology and the first time frame is an LTE subframe.

8. The method of claim 1, wherein the second wireless communication technology is a short range communication technology.

9. The method of claim 8, wherein the second wireless communication technology is a wireless local area network technology or a Bluetooth technology.

10. The method of claim 1, wherein the control region is a leading part of the first signal.

11. The method of claim 10, wherein the data region follows the control region.

12. A wireless communication device, comprising:
   a first wireless communication circuit, configured to communicate according to a first wireless communication technology; and
   a second wireless communication circuit, configured to communicate according to a second wireless communication technology;
   the first wireless communication circuit being configured to receive in a first time frame at least a control region of a first signal via the first wireless communication technology, the first time frame being set by the first communication technology for receiving the first signal and the control region indicating a schedule of a data region in the first signal, to decode the control signal, and to interrupt reception of the first signal at least for a remainder of the first time frame after receiving the control region and before the control region is completely decoded, and the second wireless communication circuit being configured to send signals via the second wireless transmission technology within the first time frame after the reception of the first signal of the first wireless communication technology was interrupted.

13. The wireless communication device of claim 12, wherein the first wireless communication circuit is configured to decode the control region after receiving the control region.

14. The wireless communication device of claim 12, wherein the first wireless communication circuit is configured to interrupt the reception of the first signal before the decoding of the control region can determine if data is scheduled to be received by the terminal device within the first time frame.

15. The wireless communication device of claim 12, wherein the first wireless communication technology is configured to retransmit unreceived data in a subsequent time frame, and wherein the first wireless communication circuit is configured to prevent an interruption of reception of a further signal of at least the subsequent time frame of the first wireless communication technology, when the decoding of the control region results in the information that data was scheduled to be received within the first time frame.

16. The wireless communication device of claim 12, wherein the first wireless communication technology and the second wireless communication technology share the same wireless transmission medium.

17. The wireless communication device of claim 12, wherein the control region is a leading part of the first signal.

18. The wireless communication device of claim 17, wherein the data region follows the control region.

19. A wireless communication circuit for communicating according to a first wireless communication technology, comprising:
- a reception circuit configured to receive in a first time frame at least a control region of a first signal via the first wireless communication technology and to decode the control region, the first time frame being set by the first communication technology for receiving the first signal and the control region indicating a schedule of a data region in the first signal;
- a control circuit configured to interrupt the reception of the first signal after receiving the control region and before the control region is completely decoded; and
- the control circuit being configured to send a command to at least a second wireless communication circuit, allowing the second wireless communication circuit to send signals via a second wireless transmission technology at least within the first time frame after reception of the first signal was interrupted.

* * * * *